Nov. 22, 1938.    B. S. AIKMAN    2,137,220

COMPRESSOR LUBRICATOR

Filed Feb. 11, 1936

INVENTOR
BURTON S. AIKMAN
BY Wm. M. Cady
ATTORNEY

Patented Nov. 22, 1938

2,137,220

UNITED STATES PATENT OFFICE 2,137,220

COMPRESSOR LUBRICATOR

Burton S. Aikman, Wilkinsburg, Pa., assignor to The Westinghouse Air Brake Company, Wilmerding, Pa., a corporation of Pennsylvania Application February 11, 1936, Serial No. 63,331

9 Claims. (Cl. 184—6)

This invention relates to fluid compressors, and more particularly to an automatic lubrication system for a compressor.

The principal object of my invention is to provide improved means controlled according to the operation of a compressor to provide a constant supply of lubricant to said compressor.

Another object of my invention is to provide a simple compressor lubrication system having relatively few moving parts and adapted to be employed in a compressor of low cost construction.

A further object of my invention is to provide an automatic lubricant supply system capable of operating with a compressor employing means for creating a partial vacuum in the crank case in order to prevent leakage of lubricant therefrom.

Figure 1:
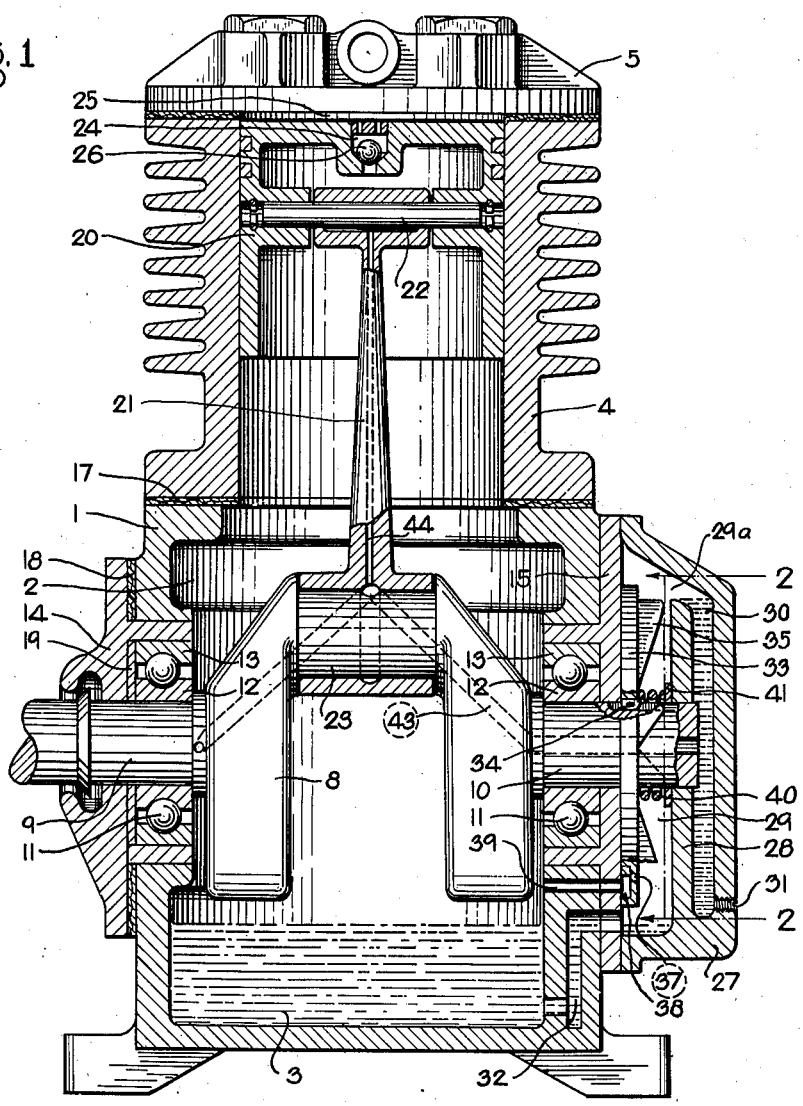
Figure 2:
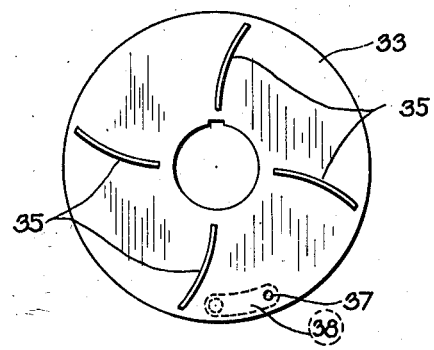

In the accompanying drawing, Fig. 1 is an elevational view, mainly in section, of a compressor embodying my invention; and Fig. 2 is a plan view of the disc member taken in the direction of the line 2—2 of Fig. 1.

As shown in the drawing, the compressor comprises a crank case section 1 having a crank case chamber 2 and containing a lubricant supply or sump 3, a cylinder section 4 mounted upon the crank case section, and a cylinder head 5, which is provided with suitable inlet and exhaust valves (not shown).

A crank shaft 8 is contained in the crank case section 1 and is mounted at opposite ends 9 and 10 in suitable bearing assemblies comprising ball bearings 11 interposed between inner races 12 which are secured to the crank shaft, and outer races 13 which are mounted in the end plates 14 and 15 respectively, said end plates being secured to the crank case section. The crank shaft 8 is adapted to be driven by any suitable means, such as a motor.

The casing sections and end plates are designed to be secured together in such a manner as will substantially seal the crank case chamber 2 from the atmosphere, one preferred means being shown in the drawing, comprising the gaskets 17 and 18 interposed between the cylinder section 4 and crank case section 1 and between said crank case section and end plate 14 respectively, and the collar member 19 provided between said end plate and the adjacent bearing assembly.

A piston 20 is reciprocably mounted in a bore in the cylinder section 4, and is driven from the crank shaft 8 by means of a connecting rod 21, which is journaled at one end in the usual wrist pin 22 in said piston and at the other end on the bearing 23 of said crank shaft. Formed in the piston 20 is a valve chamber 24 communicating with the crank case chamber 2 and a compression chamber 25 above said piston, said valve chamber containing a non-return check valve 26 adapted to permit fluid under pressure to flow from said crank case chamber to said compression chamber.

Mounted on the outer side of the end plate 15 is a casing section 27, which is secured to the end plate by suitable means, such as bolts (not shown). The casing section 27 is provided with an interior wall 28 having a suitable bore through which the end 10 of the crank shaft extends, said wall forming at one side a chamber 29 adjacent the end plate 15, and at the other side a reservoir 30, which is open to said chamber by way of an opening 29a formed in the upper portion of said wall. The reservoir 30 surrounds the face of the end 10 of the crank shaft extending through the wall 28, and at the lower end thereof has a threaded drain passage into which a removable plug 31 is screwed. The chamber 29 is connected through a passage 32 with the lubricant sump 3, said passage opening into said sump below the level of the lubricant therein.

Contained in the chamber 29 is a disc member 33, which is adapted to be rotated by the crank shaft for performing the functions of a valve and lubricant elevator. The disc member comprises an annulus having a central opening adapted to receive the end 10 of the crank shaft, said disc member being secured to said crank shaft by any suitable means, such as the key 34 inserted in suitable keyways as shown in the drawing. Provided on the outer side of the disc member are a number of radially disposed, tapered vanes or lubricant throwers 35, which project into chamber 29. A valve port 37 is formed in the disc member and communicates with an arcuate cavity 38 formed in the inner face thereof, said cavity being arranged to register with a passage 39, which is open to the crank case chamber 2, when the piston 20 is at the upper limit of the stroke, thereby establishing a communication between the chamber 29 and said crank case chamber above the level of the lubricant supply. A coil spring 40 is disposed around the end 10 of the crank shaft between the disc member 33 and a slip ring or washer 41, which is fitted to said end 10 and engages the wall 28, said spring acting to maintain the disc member in engagement with the end plate 15.

When the crank shaft 8 is rotated for operating the compressor, the connecting rod 21 causes the piston 20 to reciprocate in the cylinder in the usual manner, each downward stroke of the piston effecting a suction in the compression chamber 25 and the alternating upward stroke causing the fluid therein to be compressed. As the piston moves downwardly the volume of the crank case chamber 2 beneath said piston is decreased and fluid under pressure is forced therefrom past the check valve 26 into the compression chamber 25. The subsequent upward movement of the piston 20 then creates a partial vacuum in the crank case chamber 2, the check valve 26 preventing backflow from the chamber 25.

The piston 20 is thus operative to maintain a somewhat reduced pressure in the crank case chamber 2, thereby minimizing any tendency of the moving parts of the compressor to permit undesirable escape of lubricant due to leakage and "oil throwing".

It will be apparent that the pressure in the crank case chamber will be at a minimum when the piston completes its upward stroke, and at a maximum as said piston reaches the limit of its downward stroke. Since, on the upward stroke of the piston, the chamber 29 and connected reservoir 30 within the casing section 27 are open to the crank case chamber 2 by way of the valve port 37, cavity 38 and passage 39, the pressure of fluid in said chambers is then substantially equalized. Upon the subsequent downward stroke of the piston, the disc member 33 is rotated so as to close the valve port 37, and as the pressure in the crank case chamber increases, lubricant is forced from the sump 3 through passage 32 into the chamber 29. The lubricant quickly rises in the chamber 29 to a level within the path of the rotating throwers 35 of the disc member 33, quantities of the lubricant being then carried upwardly by said throwers and discharged therefrom by centrifugal action toward the opening 29a and against the downwardly sloping surface of the casing section 27, from which said lubricant flows into the reservoir 30.

It will be noted that the crank shaft 8 is provided with an interior drilling 43 leading from the face of the end 10 to the bearing 23 and the bearing assembly carrying the end 9, and that said drilling is connected with a similar drilling 44 leading from the bearing 23 through the connecting rod 21 to the wrist pin 22. Continued operation of the compressor will, in the manner just described, supply sufficient lubricant to the reservoir 30 to maintain said reservoir substantially filled, thereby providing a static head by means of which lubricant is supplied through the drilling 43 to the crank shaft bearings, lubricant also being supplied by way of said drilling and the drilling 44 in the connecting rod to the wrist pin 22, by the centrifugal effect of the revolving crank shaft.

It will thus be evident that I have provided improved lubrication means particularly adapted for a compressor of the type in which simplicity and economy of construction are desirable, and which will operate efficiently in a compressor employing means for reducing the crank case pressure, it being understood that the invention is not limited to the types of compressor mentioned.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid compressor having a piston and a crank case chamber containing a body of lubricant subject to variations in fluid pressure effected by operation of said piston, in combination, a lubricant reservoir from which lubricant is adapted to flow for lubricating the compressor, an auxiliary chamber open to said reservoir and communicating with said crank case chamber, means operative upon operation of the compressor to effect the flow of lubricant from the crank case chamber to the auxiliary chamber, and means operative with the compressor for supplying lubricant from the auxiliary chamber to the reservoir.

2. In a fluid compressor having a piston and a crank case chamber containing a supply of lubricant subject to variations in fluid pressure effected by operation of said piston, in combination, an auxiliary chamber communicating with the crank case chamber below a given level of the lubricant therein, means for establishing another communication from the crank case chamber above the given lubricant level to the auxiliary chamber during the compression stroke of the compressor and for closing said communication on the suction stroke, whereby upon the suction stroke of the compressor the pressure of fluid in the crank case chamber forces lubricant from the crank case chamber to the auxiliary chamber, and means operative with the compressor to supply lubricant from the auxiliary chamber for lubricating said compressor.

3. In a fluid compressor having a piston, a crank shaft for operating said piston, and a crank case chamber containing a supply of lubricant subject to variations in fluid pressure effected by operation of said piston, in combination, a lubricant reservoir from which lubricant is adapted to flow for lubricating the compressor, an auxiliary chamber communicating with the crank case chamber, means operative upon operation of the compressor to effect the flow of lubricant from the crank case chamber to the auxiliary chamber, and means operative by said crank shaft for supplying lubricant from the auxiliary chamber to the reservoir.

4. In a fluid compressor having a piston and a crank case chamber containing a supply of lubricant subject to variations in fluid pressure effected by operation of said piston, in combination, a lubricant reservoir from which lubricant is adapted to flow for lubricating the compressor, an auxiliary chamber communicating with said crank case chamber, valve means operative to exhaust fluid pressure from said auxiliary chamber into the crank case chamber upon the outward stroke of the piston, and means for supplying lubricant from said auxiliary chamber to the reservoir.

5. In a fluid compressor having a piston, a crank shaft for operating said piston, and a crank case chamber containing a supply of lubricant subject to variations in fluid pressure effected by operation of said piston, in combination, a lubricant reservoir from which lubricant is adapted to flow for lubricating the compressor, a chamber open to said reservoir and communicating with said crank case chamber, a rotary valve operative by the crank shaft to vent fluid under pressure from said chamber into the crank case chamber only upon the compression stroke of the piston, and conveyor means contained in said chamber and operative by said crank shaft for conveying lubricant into the reservoir, whereby upon the suction stroke of said piston, lubricant is forced into said chamber within the path of said conveyor means.

6. In a fluid compressor having a piston and a crank case chamber containing a supply of lubricant subject to variations in pressure effected by operation of said piston, in combination, a check valve in said piston arranged to permit the flow of fluid under pressure from the crank case on the suction stroke of the piston, a lubricant reservoir from which lubricant is adapted to flow for lubricating the compressor, a chamber open to said reservoir and communicating with said crank case chamber, means for conveying lubricant from said chamber to said reservoir and operative by the compressor, and a valve operative only upon the compression strokes of said piston to establish another communication between said chamber and the crank case chamber, whereby upon the suction strokes of said piston, lubricant is forced from the crank case chamber into said chamber and is conveyed therefrom into the reservoir by said means.

7. In a fluid compressor having a piston and a crank case chamber containing a supply of lubricant subject to variations in pressure effected by operation of said piston, in combination, a check valve in said piston arranged to permit the flow of fluid under pressure from the crank case on the suction stroke of the piston, a lubricant reservoir from which lubricant is adapted to flow for lubricating the compressor, an auxiliary chamber communicating with the crank case chamber, means operative upon operation of the compressor to effect the flow of lubricant from the crank case chamber to the auxiliary chamber, and means operative with the compressor for supplying lubricant from the auxiliary chamber to the reservoir.

8. In a fluid compressor having a piston, a crank shaft, and a crank case chamber containing a supply of lubricant and subject to variations in fluid pressure effected by operation of said piston, in combination, a lubricant reservoir from which lubricant is supplied for lubricating the compressor, an auxiliary chamber open to said reservoir and communicating with said crank case chamber below the normal level of lubricant therein, valve means operated by said crank shaft for controlling another communication between the crank case chamber and said auxiliary chamber, and mechanical means for conveying lubricant from said auxiliary chamber to said lubricant reservoir.

9. In a fluid compressor having a piston, in combination, a chamber containing a supply of fluid lubricant and subject to variations in fluid pressure effected by operation of said piston, a lubricant reservoir from which lubricant is adapted to flow for lubricating the compressor, an auxiliary chamber communicating with said supply chamber, means operative upon operation of the compressor to effect a reduction in the pressure of air in said auxiliary chamber to facilitate the flow of lubricant from the supply chamber to the auxiliary chamber, and means operative with the compressor for supplying lubricant from said auxiliary chamber to said reservoir.

BURTON S. AIKMAN.